US007159012B2

(12) United States Patent
Viollet et al.

(10) Patent No.: US 7,159,012 B2
(45) Date of Patent: Jan. 2, 2007

(54) COMPUTATIONAL DATA PROCESSING SYSTEM AND COMPUTATIONAL PROCESS IMPLEMENTED BY MEANS OF SUCH A SYSTEM

(75) Inventors: Edouard Viollet, Lyons (FR); Thierry Convard, Sathonay Camp (FR); Jacques Barbanton, Brignais (FR)

(73) Assignee: LIPHA, Lyons (FR)

( * ) Notice: Subject to any disclaimer, the term of this patent is extended or adjusted under 35 U.S.C. 154(b) by 623 days.

(21) Appl. No.: 09/808,005

(22) Filed: Mar. 15, 2001

(65) Prior Publication Data

US 2001/0023434 A1  Sep. 20, 2001

(30) Foreign Application Priority Data

Mar. 17, 2000  (FR) .................................. 00 03481

(51) Int. Cl.
*G06F 15/16* (2006.01)
*G06F 9/50* (2006.01)

(52) U.S. Cl. ...................... 709/208; 709/201; 709/205; 709/209; 709/211; 718/106

(58) Field of Classification Search ................ 709/208, 709/213, 201, 223, 224, 205, 209, 211; 707/10; 712/28; 718/106
See application file for complete search history.

(56) References Cited

U.S. PATENT DOCUMENTS

| 5,909,681 | A | * | 6/1999 | Passera et al. ................. 707/10 |
| 6,009,455 | A | | 12/1999 | Doyle |
| 6,071,190 | A | * | 6/2000 | Weiss et al. ................... 463/25 |
| 6,085,244 | A | * | 7/2000 | Wookey ...................... 709/224 |
| 6,151,621 | A | * | 11/2000 | Colyer et al. ............... 709/208 |
| 6,263,330 | B1 | * | 7/2001 | Bessette ...................... 709/203 |
| 6,434,594 | B1 | * | 8/2002 | Wesemann .................. 709/201 |
| 6,609,127 | B1 | * | 8/2003 | Lee et al. ..................... 707/10 |
| 6,618,820 | B1 | * | 9/2003 | Krum .......................... 714/13 |
| 2001/0013049 | A1 | * | 8/2001 | Ellis, III ..................... 709/201 |

FOREIGN PATENT DOCUMENTS

EP   0 890 901 A1   1/1999

OTHER PUBLICATIONS

XP-002155912, "PREACHERS—Portable Recovery and Checkpointing in Heterogeneous Systems", 1998.

* cited by examiner

*Primary Examiner*—Jeffrey Pwu
(74) *Attorney, Agent, or Firm*—Young & Thompson

(57) ABSTRACT

This computational data processing system comprises an assembly of networked computers (12, . . . 22) in each of which is stored at least one computational application, and a machine (10) for storing computational data which is linked to the network and in communication with the computers, at least one of the computers (12) operating as master computer and at least some of the other computers (14, . . . 22) operating as slave computer. At least one of the computers comprises, stored in memory an algorithm for configuring the other computers of the network as slave computers and an executable master application for managing the tasks of each slave computer (14, . . . 22) as a function of their availability for the assignment, to each of them, of computational tasks and of corresponding computational data which are stored in the storage machine (10).

6 Claims, 5 Drawing Sheets

COMPUTATIONAL DATA PROCESSING SYSTEM AND COMPUTATIONAL PROCESS IMPLEMENTED BY MEANS OF SUCH A SYSTEM

BACKGROUND OF THE INVENTION

The present invention relates to a computational data processing system and to a computational process using such a system and, in particular, to a computational process used for the computation of molecular models.

For example, in such an application, for the processing of around 63 000 molecules, at a rate of 1 000 arrangements per molecule, the processing time may be as much as sixteen months on a single-processor machine.

To alleviate this drawback, use is made of a computational data processing system of the type comprising an assembly of networked computers in each of which is stored a computational application, and a data processing machine for storing computational data which is linked to the network and in communication with the computers.

One of the computers can be used in the guise of master computer, the other computers operating in the guise of slave computer.

This set-up allows a considerable reduction in the processing time. However, it is not acceptable in so far as in order to increase the processing speed it is necessary to increase the number of computers, thereby bringing about a prohibitive increase in cost.

Furthermore, the system must be completely reconfigured when one wishes to add computers to the system.

The aim of the invention is to alleviate this drawback.

SUMMARY OF THE INVENTION

The subject of the invention is therefore a computational data processing system of the aforesaid type, characterized in that at least one of the computers comprises, stored in memory, an algorithm for configuring the other computers of the network as slave computer, and for assigning, to each of them, computational tasks and corresponding computational data which are stored in the storage machine, and an executable master application for managing the tasks of each slave computer as a function of their availability and retrieving the data resulting from the parallel execution of the computational applications.

Thus, and contrary to the state of the art, parallelism is not incorporated at the level of the computational application itself but at an independent higher software level. A parallelism of tasks is thus obtained rather than software parallelism, the slave computers carrying out entirely identical tasks but on the basis of different data.

The computational data processing system according to the invention can furthermore comprise one or more of the following characteristics, taken in isolation or according to all technically possible combinations:

the said configuring algorithm and the said master application are loaded into each computer of the network, the execution of the said configuring algorithm by one of the computers constituting a means of configuring the latter as master computer;

each computer furthermore comprises an executable slave application under the control of the master computer when this computer is configured as slave computer, the said slave application comprising software means for talking to the storage machine;

the said software means for talking to the storage machine comprise means for exchanging data according to a file transfer protocol;

each master computer comprises, stored in memory, an electronic signature and means for comparing the said signature and an electronic signature of a slave computer with which it communicates so as to authorize the running of the computational application by the latter computer;

the configuring algorithm comprises software means for formulating a man/machine interface suitable for display on a screen of each computer for the configuring of the said computers.

The subject of the invention is also a computational process by means of a data processing system as defined hereinabove, characterized in that it comprises the steps of:

defining at least one group of computers by configuring for each of them one of the computers as master computer and other computers as slave computers;

assigning, to each of the slave computers, one or more computational applications and corresponding computational data;

comparing an electronic signature sent by each slave computer to the master computer with a corresponding signature stored in the latter; and in the case of correspondence between the said signatures:

running, for each slave computer, the computational application or applications as a function of their availability, using the corresponding computational data; and retrieving the data resulting from the execution of the applications carried out in parallel, in each slave computer.

Finally, the subject of the invention is a computational process as defined hereinabove, for molecular modelling computations on the basis of molecular data stored in a data server.

BRIEF DESCRIPTION OF THE DRAWINGS

Other characteristics and advantages will emerge from the following description, given merely by way of example and with reference to the appended drawings in which.

DESCRIPTION OF THE PREFERRED EMBODIMENTS

Figure 1:
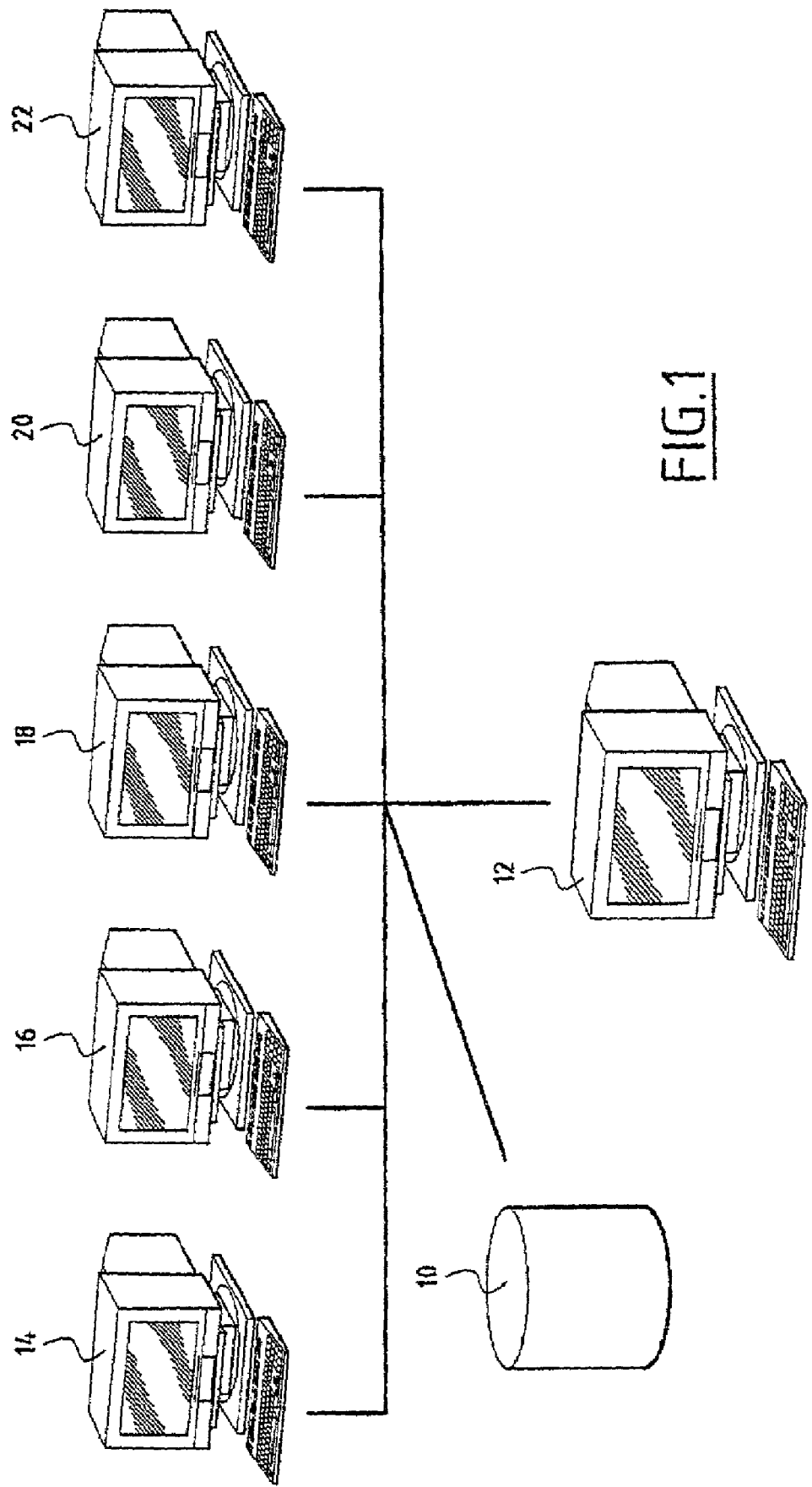
FIG. 1 is a diagrammatic view of the computational data processing system according to the invention.

Represented in FIG. 1, diagrammatically, is the structure of a computational data processing system in accordance with the invention.

For example, this system is used to carry out molecular modelling computations on the basis of data stored in a data processing machine 10 for storing data, or data server.

As may be seen in this FIG. 1, the system comprises an assembly of networked computers 12, 14, 16, 18, 20 and 22, to which is linked the storage machine 10, and operating in parallel under the control of a master computer.

In the exemplary embodiment represented in FIG. 1, one of the computers 12 operates in the guise of master computer, the other computers 14, 16, 18, 20 and 22 operating in the guise of slave computers.

One or more computational applications is stored in each of the computers, and in particular in the computers operating in the guise of slave.

It will be noted that the computational application consists of a conventional, and hence interchangeable, computational algorithm appropriate for the use envisaged.

It will therefore not be described in detail hereinbelow.

It will be noted however that, in the application envisaged, the computational application is capable of carrying out molecular modelling computational operations on the basis of data extracted from the storage machine 10.

Thus, according to the configuration envisaged, the master computer 12 assigns, to each of the slave computers 14, 16, 18, 20 and 22, one or more computational applications as well as the corresponding computational data required for the operation of the applications, doing so as a function of their availability. It subsequently retrieves, after computations, the results delivered by each of the slave computers.

Figure 2:
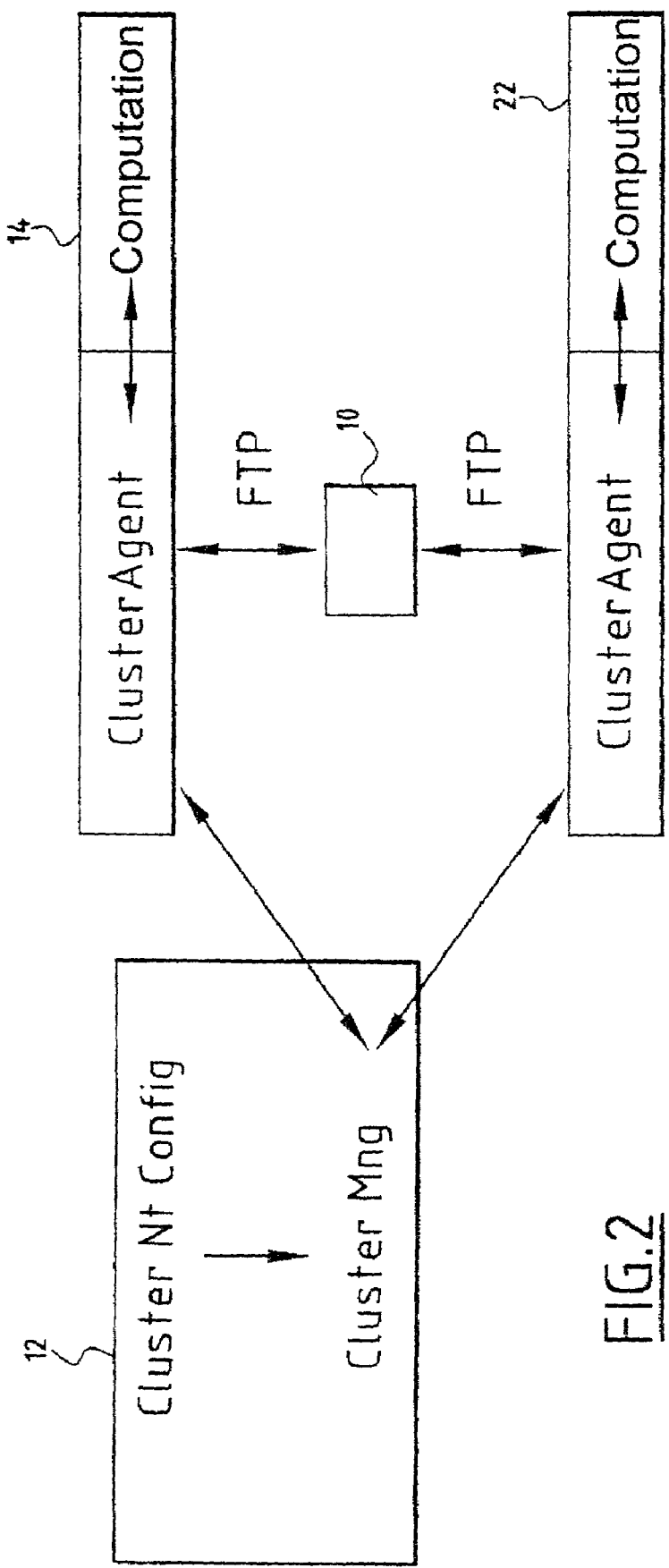
FIG. 2 is a diagram showing the software architecture of the data processing system of FIG. 1.

To do this configuring, with reference to FIG. 2, in which the software architecture of the data processing system of FIG. 1 has been represented, the master computer 12 comprises, stored in memory, a first algorithm "ClusterNtConfig" allowing the configuring of the assembly of computers of the system, and in particular of the other computers as slave computers.

The master computer 12 also comprises, stored in memory, an algorithm "ClusterMng" constituting an executable master software application for managing the tasks of each slave computer as a function of their availability and retrieving the data resulting from the parallel execution of the computational applications by the slave computers for the assigning, to each of them, of computational tasks and of corresponding computational data which are stored in the storage machine 10.

Moreover, each slave computer 14, . . . 22 comprises a slave application "ClusterAgent" executable on request by the master computer 12, when the computer is configured as slave, so as to manage the computational application locally.

For example, the master computer 12 and the slave computers 14, . . . 22 talk to one another using a software application for passing messages. Of course, other appropriate applications for transferring information between the master computer and the slave computers can be used as a variant.

The "ClusterAgent" slave application of each slave computer comprises software means allowing dialogue with the storage machine 10.

For example, these software means are adapted for exchanging data according to a file transfer protocol FTP, for example the FTP protocol.

Finally, it may be seen in FIG. 2 that each slave computer 14, . . . 22 also comprises, stored in memory, the computational application proper, providing for the envisaged computation on the basis of the data extracted from the storage machine 10.

The computational results output by each slave computer 14, . . . 22 are then returned to the storage machine 10.

Figure 3:
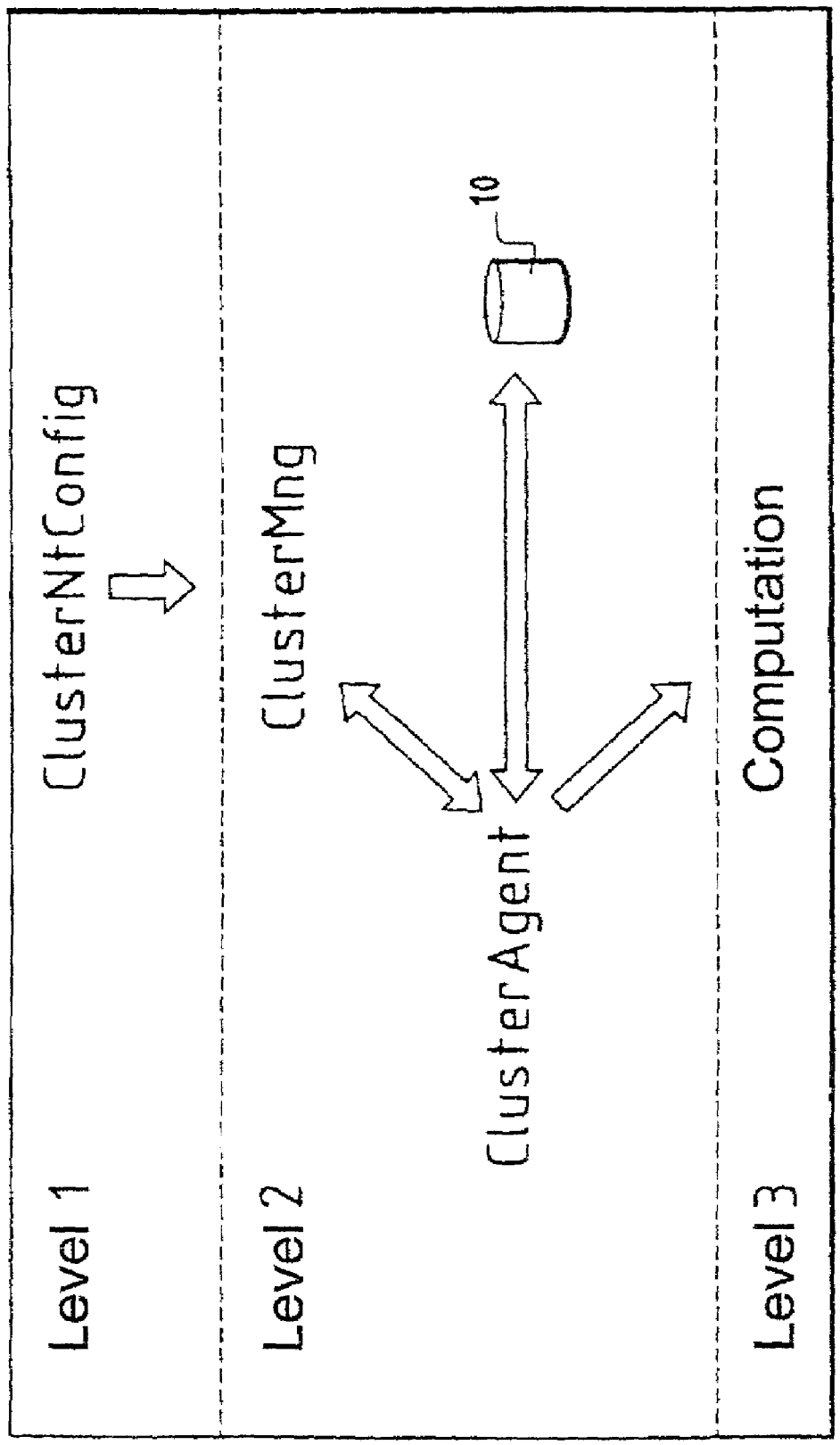
FIG. 3 is a diagram showing the various software levels of the data processing system according to the invention.

As will be appreciated, and as may be seen in FIG. 3, the software architecture just described exhibits a multi-level architecture. Thus, the parallelism of the tasks performed within each slave computer 14, . . . 22 is effected, not at the level of the computational applications, but at the level of an independent higher software layer.

Specifically, the software architecture exhibits a first level "level 1" which incorporates the configuring algorithm "ClusterNtConfig" and which thus makes it possible to define a computer as master, and the others as slave.

A second level, "level 2", incorporates the master application "ClusterMng" which provides for the management proper of the tasks of each slave computer as a function of their availability. It also incorporates the slave applications "ClusterAgent" which provide for local management, that is to say management at the level of each slave computer, data transfer on the one hand, and the running of the computational software on the other hand.

A third level "level 3", incorporates the computational application proper which is run by each slave application "ClusterAgent" for each processing operation to be performed, under the control of level 2.

It will be noted that, as mentioned earlier, level 1 constitutes an initial, independent, level making it possible to configure the data processing system.

Figure 4:
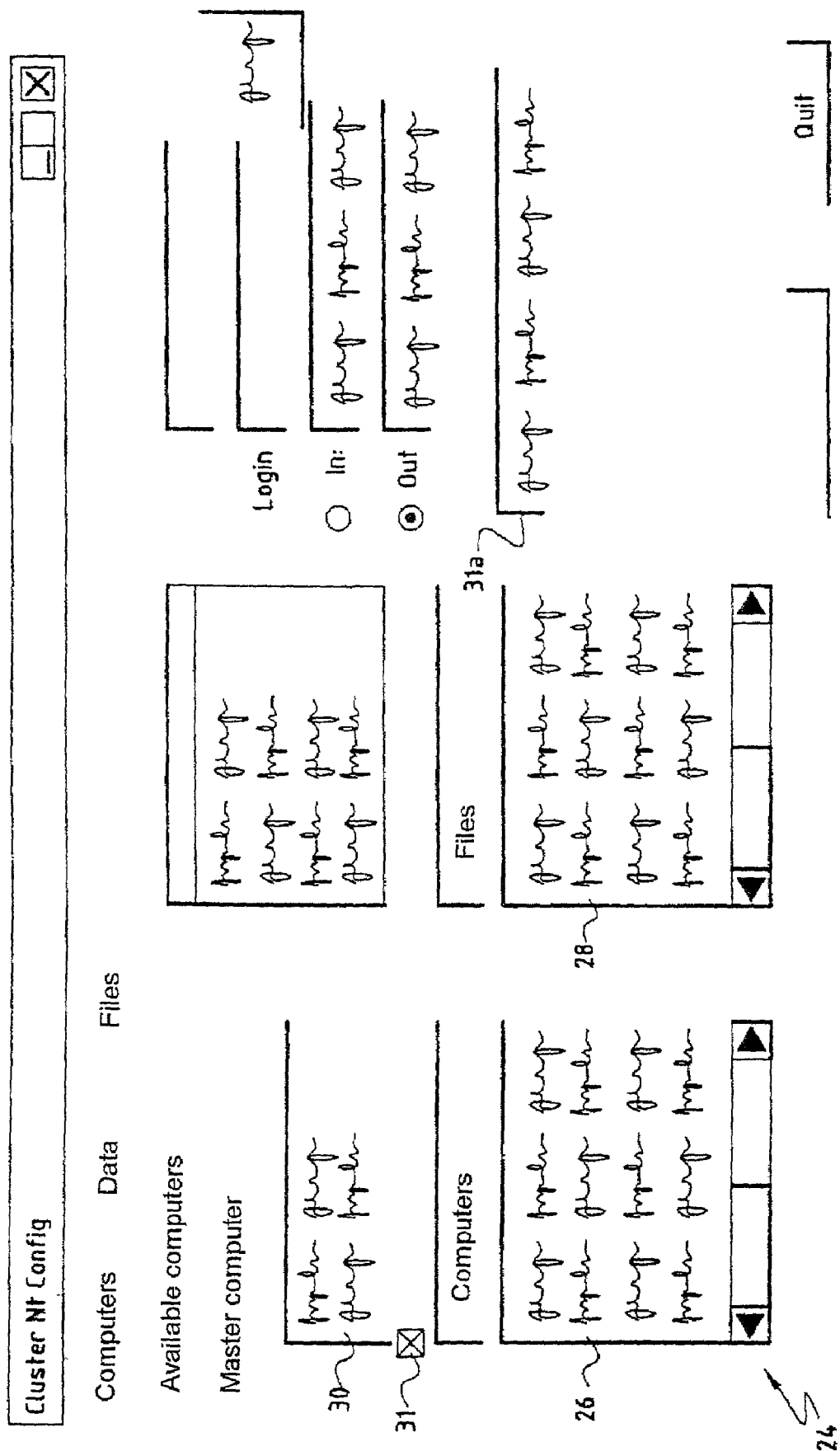
FIG. 4 shows a graphics interface available at the level of the master computer for configuring the data processing system.

With reference to FIG. 4, this software level makes it possible to generate, on the screen of the computer intended to be configured as master, a man/machine graphics interface 24. This interface comprises in particular a first area 26 making it possible to list the computers involved in the data processing system as well as an area 28 making it possible to list the data files used by the computational application.

A window 30 makes it possible to indicate the computer operating as master computer.

A tick box 31 makes it possible to indicate whether the master machine will also be used as a computer.

An editing area 31-*a* makes it possible to indicate the command line of the computational application of level 3 to be used on each slave computer.

After configuring, with the aid of this interface, the assembly of computers, and executing the configuring algorithm, a transition between level 1 and level 2 occurs.

In the course of this transition, the message transfer software interface is executed by providing it with the list of computers and the management algorithm "ClusterMng" and/or "ClusterAgent" which they have to execute, namely on the one hand the indication of the computer which is using the master software application "ClusterMng" which is associated with the master computer, and the slave application "ClusterAgent" associated with the slave computers.

In level 2 of the software architecture, the slave computers communicate with the master computer by means of the message transfer software interface and communicate with the storage machine 10 according to the format of the file transfer protocol (FTP for example).

As mentioned earlier, the slave application "ClusterAgent" carries out the local management of the computational applications and instigates, on request by the master computer 12, the running of the computational applications of level 3 of the architecture.

It will be noted however that the software architecture, and in particular the file tree used in the system, is reproduced identically on each computer.

Thus, there is no environmental difference between a master computer and a slave computer, it being possible for a computer to be configured either in the guise of master computer or in the guise of slave computer.

It will be noted in fact that the execution of the configuring algorithm by one of the computers constitutes a means of configuring the latter in the guise of master computer.

Of course, the data processing system can use several master computers. In this case, the slave computers associated with it cannot be used to run computational applications on behalf of another master computer.

It is thus possible to use a pool of machines by defining various groups of independent machines in this pool.

Figure 5:
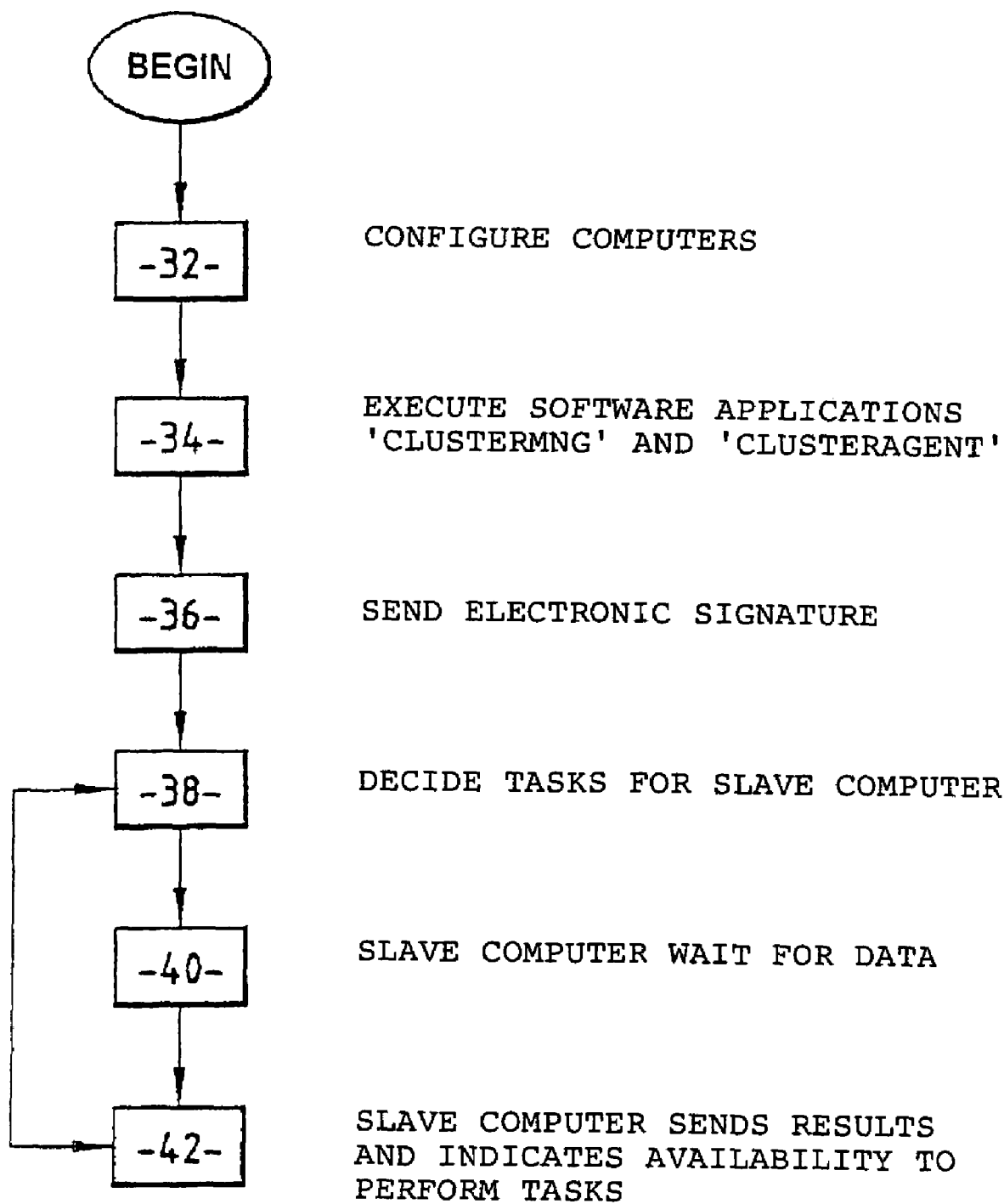
FIG. 5 is an algorithm showing the main phases of the computational process using the data processing system in accordance with the invention.

The main phases of the computational process implemented by means of the data processing system just described will now be described with reference to FIG. 5.

The first step 32 of this procedure corresponds to the configuring of the assembly of computers of the system, using the interface accessible on the computer intended to become master.

As mentioned earlier, the execution of the configuring algorithm instigates the automatic configuring of the computer as master computer.

Moreover, and as mentioned earlier, the execution of this configuring algorithm instigates the execution on the master machine of the software application "ClusterMng" and, possibly, if the master machine must also be used in the guise of a computer, of the slave application "ClusterAgent" and, on all the slave machines, of the application "ClusterAgent" (step 34).

During the next step 36, each slave computer sends the master computer 12 an electronic signature between "ClusterMng" and "ClusterAgent". The latter computer compares the electronic signature received with a corresponding electronic signature stored in the master computer, then sends its verdict back to the slave computer. This signature makes it possible to verify that all the computations performed on the group of computers will be performed with the same version of the "ClusterAgent" slave application and makes it possible to discard an invalid slave computer.

For example, the electronic signature takes the form of a 256-byte message, the verdict taking the form of a four-byte message.

In the course of this step, if the signature of each slave computer is correct, each of them sends the master computer a message indicating that it is ready.

During the next step 38, when the master computer 12 receives a message originating from a slave computer indicating that the latter is ready, it decides, as a function of the previously configured schedules of tasks and of the data to be processed, what each slave computer must do.

If each slave computer is available and if there are still data to be computed, the master computer sends it the name of the data item as well as the corresponding command line so as to instigate the running of the associated computational application.

If no data item is available, the master computer orders the slave computer concerned to wait. If the computer concerned is unavailable for scheduling reasons, the master computer asks it to wait (step 40).

During the final step 42, the slave computer sends the computation results to the storage machine and notifies the master computer that it is available to perform other computations. The master computer then centralizes, for statistical purposes, the information sent by the slave computer (transfer time, execution time, computation time etc.).

It is appreciated that the invention just described, which uses novel independent software for configuring the computers of the system makes it possible to obtain a parallelism of tasks which is independent of the computational application.

It is thus possible easily to increase the number of computers of the system so as to reduce the processing time.

Moreover, in so far as it is possible to plan a schedule while configuring the tasks assigned to each computer, it is possible to use machines of a data processing pool which are for the moment unused, for example at night or at the weekend.

The data processing resources of a pool of networked computers are thus optimized.

The invention claimed is:

1. Computational data processing system, comprising:
an assembly of networked computers in each of which is stored at least one computational application, and
a data processing machine for storing computational data which is linked to the network and in communication with the computers, wherein each one of the computers comprises, stored in memory,
an algorithm (ClusterNtConfig) for configuring the other computers of the network as slave computers,
an executable master application for managing the tasks of each slave computer as a function of availability of the respective slave computer for assignment of computational tasks and of corresponding computational data which are stored in the storage machine,
an electronic signature, and
means for comparing said signature and an electronic signature of a slave computer with which it communicates so as to authorize the running of the computational application by the latter computer,
wherein the execution of said configuring algorithm by one of the computers constituting a means of configuring the one of the computers as a master computer.

2. System according to claim 1,
wherein each computer furthermore comprises an executable slave application under the control of the master computer when this computer is configured as slave, for the local management of the computational application, said slave application comprising software means for talking to the storage machine .

3. System according to claim 2,
wherein said software means for talking to the storage machine comprise means for exchanging data according to a file transfer protocol.

4. System according to claim 1,
wherein the configuring algorithm comprises software means for formulating a man/machine interface suitable for display on a screen of each computer for the configuring of said computers.

5. Process of computation by means of a data processing system according to claim 1, comprising the steps of
defining at least one group of computers by configuring for each group a computer as master computer and other computers as slave computers;
assigning, to each of the slave computers, one or more computational applications and corresponding computational data;
comparing an electronic signature sent by each slave computer to the master computer with a corresponding signature stored in the latter; and in the case of correspondence between the signatures:
running, for each slave computer, the computational application or applications as a function of their availability, using the corresponding computational data; and
retrieving the data resulting from the execution of the applications carried out in parallel, in each slave computer.

6. Use of a computational process according to claim 5 for the computation of molecular models on the basis of molecular data stored in a data server.

* * * * *